May 1, 1923.
R. L. NOBLE
DRAFT EQUALIZER
Filed March 30, 1922
1,453,886
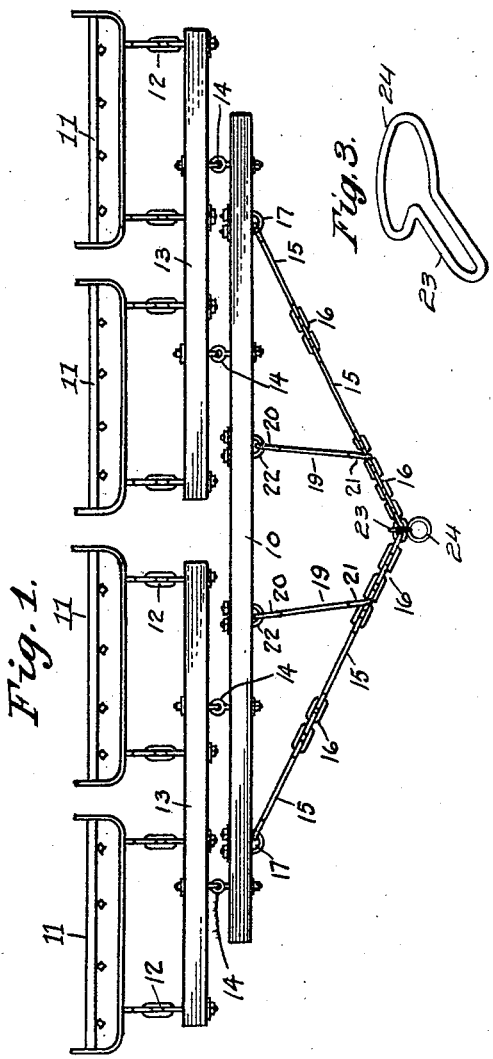
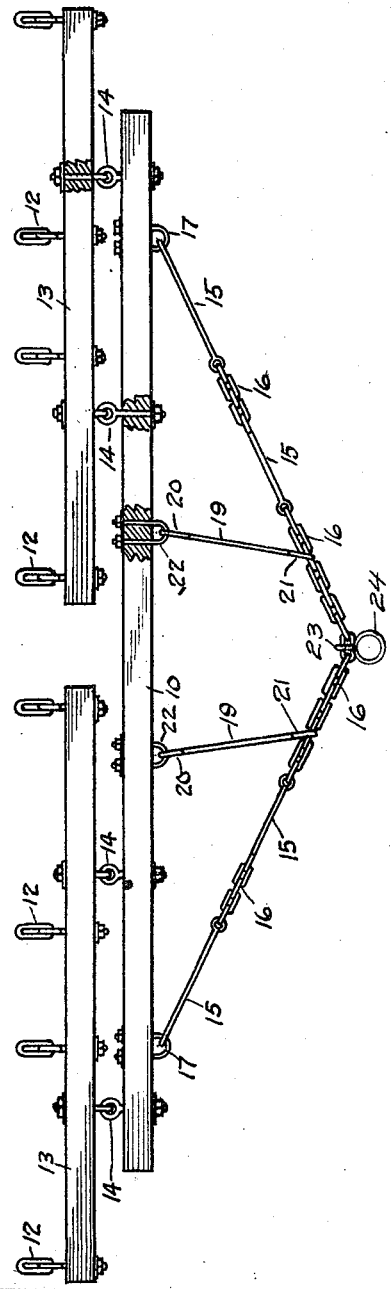
Roy L. Noble INVENTOR.
BY Geo. P. Kimmel ATTORNEY.

Patented May 1, 1923.

1,453,886

UNITED STATES PATENT OFFICE.

ROY L. NOBLE, OF SAC CITY, IOWA.

DRAFT EQUALIZER.

Application filed March 30, 1922. Serial No. 548,124.

*To all whom it may concern:*

Be it known that I, Roy L. Noble, a citizen of the United States, residing at Sac City, in the county of Sac and State of Iowa, have invented certain new and useful Improvements in Draft Equalizers, of which the following is a specification.

This invention relates to improvements in draft equalizers, and has for one of its objects to provide a device of this character of increased efficiency and utility.

Another object of the invention is to provide a device of this character wherein a plurality of implements, such as harrows and the like, may be coupled together and side draft substantially eliminated.

With these and other objects in view the invention consists in certain novel features of construction as hereinafter shown and described and then specifically pointed out in the claim, and in the drawings illustrative of the preferred embodiment of the invention :—

Figure 1 is a plan view of the improved device applied to a plurality of harrow frames.

Fig. 2 is a plan view, enlarged, and partly in section, of the improved device.

Fig. 3 is an enlarged perspective view of the adjustable draft hitch.

The improved implement is more particularly adapted for use in connection with a plurality of harrows and like implements, and for the purpose of illustration is shown thus applied.

The improved implement comprises a main evener beam 10 which may be of any required length to enable it to be coupled to a plurality of harrows or like implements. The improved device is designed to be used more particularly in connection with three or more harrows, and in the drawings is shown the representation of portions of conventional harrow frames 11 flexibly coupled at 12 to the main evener beam through the medium of shorter evener beams 13, flexibly coupled in turn at 14 to the main evener beam 10.

A coupling for a draft appliance is connected to the main evener beam and comprises two flexible members each formed of alternating rods 15 and sections of chains 16, with one of the rods of the coupling device flexibly connected as by U-bolts 17 to the main evener beam 10 near its ends.

The central chain member 16 is continuous. Adjustably coupled to this central member is a hitch device constructed as shown in Fig. 3 and including a contracted portion 23 and 24, the contracted portion adapted to engage one of the links of the chain and the ring or eye 24 to receive a draft appliance, not shown.

The member 23—24 may be adjusted laterally to "balance" the hitch, as will be obvious.

Stay members 19 provided with eyes 20 and 21 at the ends, are coupled by the eyes 20 to U bolts 22 attached to the main evener beam 10 and spaced from the center, and coupled by the eyes 21 at the other end to the chains 16 to which the ring 18 is coupled.

The stay members 19 are thus spaced at each end from the draft appliance when applied to the eye 24.

The draft appliance coupled to the eye 24 may be one or more teams of horses, a tractor, or a harrow cart, or the like, as required.

By the use of the improved device side draft is substantially eliminated and the device effectually balanced and the operation of hitching the horses or other draft medium materially simplified, as the "hitch" is made at one point only.

The improved device may be applied without material structural change to any four section harrow, and the earth will not be "stacked" at the turn at the end of the row.

The stay members 19 effectually prevent the danger of bending or breaking the rods when turning at the end of the row.

The improved device is simple in construction, can be inexpensively manufactured, and operates effectually for the purposes described.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

A draft equalizer comprising a main evener beam, shorter evener beams coupled to the main evener beam at opposite sides of the center thereof and adapted to be hitched to the implements to be drawn, a draft appliance coupled at its ends near the ends of the main evener beam, and stay members each coupled at one end to the draft appliance at one side of the center thereof and at their other ends to the main evener beam intermediate the ends of the same.

In testimony whereof, I affix my signature hereto.

ROY L. NOBLE.